(12) United States Patent  
Tompkins et al.

(10) Patent No.: US 8,570,044 B2  
(45) Date of Patent: Oct. 29, 2013

(54) PROVIDING MEASUREMENTS TO ENABLE DETERMINATION OF ELECTRICAL RESISTIVITY ANISOTROPY OF A SUBTERRANEAN STRUCTURE

(75) Inventors: Michael Tompkins, San Francisco, CA (US); David L. Alumbaugh, Berkeley, CA (US)

(73) Assignee: WesternGeco L.L.C., Houston, TX (US)

( * ) Notice: Subject to any disclaimer, the term of this patent is extended or adjusted under 35 U.S.C. 154(b) by 664 days.

(21) Appl. No.: 12/715,004

(22) Filed: Mar. 1, 2010

(65) Prior Publication Data

US 2011/0210743 A1 Sep. 1, 2011

(51) Int. Cl.
*G01V 3/00* (2006.01)

(52) U.S. Cl.
USPC .................. 324/338; 367/20; 367/15; 702/7; 702/8; 324/365; 114/244

(58) Field of Classification Search
USPC ......................................................... 324/338
See application file for complete search history.

(56) References Cited

U.S. PATENT DOCUMENTS

| | | | |
|---|---|---|---|
| 4,617,518 A * | 10/1986 | Srnka | 324/365 |
| 6,603,313 B1 * | 8/2003 | Srnka | 324/354 |
| 8,115,491 B2 | 2/2012 | Alumbaugh et al. | |
| 8,198,899 B2 * | 6/2012 | Lindqvist | 324/365 |
| 2002/0105333 A1 * | 8/2002 | Amini | 324/338 |
| 2002/0113592 A1 * | 8/2002 | Omeragic | 324/339 |
| 2003/0146751 A1 * | 8/2003 | Rosthal et al. | 324/338 |
| 2006/0038571 A1 * | 2/2006 | Ostermeier et al. | 324/338 |
| 2007/0280047 A1 * | 12/2007 | MacGregor et al. | 367/15 |
| 2009/0082970 A1 * | 3/2009 | Andreis et al. | 702/8 |
| 2009/0096457 A1 | 4/2009 | Srnka et al. | |
| 2009/0126939 A1 | 5/2009 | Lu et al. | |
| 2010/0057363 A1 * | 3/2010 | Amundsen | 702/5 |
| 2010/0109671 A1 * | 5/2010 | Hobbs | 324/334 |
| 2010/0171501 A1 | 7/2010 | Alumbaugh et al. | |
| 2010/0179762 A1 * | 7/2010 | Tabarovsky et al. | 702/7 |
| 2010/0250140 A1 * | 9/2010 | Constable et al. | 702/7 |
| 2011/0158042 A1 * | 6/2011 | Moldoveanu et al. | 367/15 |
| 2011/0166840 A1 * | 7/2011 | Green et al. | 703/2 |
| 2011/0174207 A1 * | 7/2011 | Harrick et al. | 114/244 |
| 2011/0199857 A1 * | 8/2011 | Garden | 367/20 |
| 2011/0203509 A1 * | 8/2011 | Austad et al. | 114/244 |
| 2012/0087207 A1 * | 4/2012 | Kostov et al. | 367/20 |

FOREIGN PATENT DOCUMENTS

WO 2006135510 A1 12/2006
WO 2009006464 1/2009

OTHER PUBLICATIONS

Hoversten, et al., Integration of Multiple Electromagnetic Imaging and Inversion Techniques for Prospect Evaluation, SEG Expanded Abstract, 2006, pp. 719-723, vol. 25.

Loseth, Marine CSEM Signal Propagation in TIV Media, SEG Expanded Abstracts, 2007, pp. 638-642, vol. 26.

(Continued)

*Primary Examiner* — Melissa Koval
*Assistant Examiner* — Benjamin M Baldridge (57) ABSTRACT

To analyze content of a subterranean structure, electric field measurements at plural source-receiver azimuths in a predefined range are received. Total magnetic field measurements are also received at plural source-receiver azimuths in the predefined range. The electric field measurements and the total magnetic field measurements are provided to an analysis module to enable determination of electrical resistivity anisotropy of the subterranean structure.

16 Claims, 8 Drawing Sheets

(56) References Cited

OTHER PUBLICATIONS

Lu, et al., Understanding Anisotropy in Marine CSEM Data, SEG Expanded Abstracts, 2007, pp. 633-637, vol. 26.

Tompkins, et al., The Role of Vertical Anisotropy in Interpreting Marine Marine Controlled-Source Electromagnetic Data, SEG Expanded Abstracts, pp. 514-517, vol. 24, 2005.

Tompkins, et al., Effects of Vertical Anisotropy on Marine Active Source Electromagnetic Data and Inversion, 66th Annual Conference and Exhibition, 2004.

International Search Report and Written Opinion of PCT Application No. PCAT/US2011/026739 dated Oct. 21, 2011: pp. 1-8.

* cited by examiner

PROVIDING MEASUREMENTS TO ENABLE DETERMINATION OF ELECTRICAL RESISTIVITY ANISOTROPY OF A SUBTERRANEAN STRUCTURE

BACKGROUND

A controlled source electromagnetic (CSEM) survey technique can be used to perform a survey of a subterranean structure for identifying elements of interest, such as hydrocarbon-bearing reservoirs, gas injection zones, thin carbonate or salt layers, fresh-water aquifers, and so forth. With CSEM surveying, an electromagnetic (EM) transmitter is used to generate EM signals. In the marine survey context, EM receivers can be deployed on a water bottom surface, such as a sea floor, within an area of interest to make measurements from which information about the subterranean structure can be derived. The EM receivers may include a number of sensors for detecting any combination of electric fields, electric currents, and magnetic fields.

In some implementations of CSEM surveying, a polarized electric or magnetic dipole source is used to excite an EM signal which propagates through the subterranean structure and is perturbed by geologic variations to depths of several kilometers. Spatially-distributed, multi-component, broadband EM receivers can record the EM energy that has been perturbed by the geologic variations.

Subsurface electrical resistivity anisotropy can affect the accuracy of measurements recorded using conventional CSEM surveying techniques. Subsurface electrical resistivity anisotropy is an effect that causes resistivity in the subsurface to be strongly dependent upon the direction of electrical current flow used to make measurements. The most dominant form of electrical resistivity anisotropy is vertical transverse isotropy (VTI), in which the vertical electrical resistivity can be much larger than the horizontal electrical resistivity.

One traditional technique of determining electrical resistivity anisotropy is by recording inline and offline (i.e., broadside) component electrical and magnetic field data. Inline data refers to data acquired when the EM receiver dipole is aligned along the same axis as the EM source dipole (in other words, the dipoles of the source and receiver are co-axial) and both are aligned with the tow direction. Offline (or broadside) data refers to data acquired when the EM receiver dipole axis is parallel to the EM source dipole axis, but located off axis (dipoles are co-planar), while both axes of the source dipole and receiver dipole are aligned parallel to the tow direction. Having to obtain EM data in both the inline and offline directions means that one or more EM sources would have to be towed first in the inline direction and then in the offline direction, which is time consuming and adds complexity to the surveying technique.

SUMMARY

In general, according to an embodiment, a method of analyzing content of a subterranean structure comprises receiving electric field measurements at plural source-receiver azimuths in a predefined range, and receiving total magnetic field measurements at plural source-receiver azimuths in the predefined range. The electric field measurements and the total magnetic field measurements are provided to an analysis controller to enable determination of electrical resistivity anisotropy of the subterranean structure.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

In accordance with some embodiments, a technique of determining electrical resistivity anisotropy of a subterranean structure is provided. The dominant form of electrical resistivity anisotropy is vertical transverse isotropy (VTI). The technique according to some embodiments involves obtaining electromagnetic (EM) data recorded over a relatively limited range of source-receiver azimuths, and using such EM data recorded over the relatively limited range of source-receiver azimuths to determine electrical resistivity anisotropy.

An azimuth refers to the angle between the axis of an EM source (e.g., a source dipole polarization) and a radial line between the EM source and an EM receiver (e.g., a receiver dipole polarization) used to acquire the EM data. A dipole is formed of a pair of electrodes. In some embodiments, the limited range of source-receiver azimuths is a range that starts at a first azimuth and ends at a second azimuth, where the difference between the first and second azimuth is less than 45°. In a more general embodiment, the difference between the first and second azimuths is less than or equal to 60°, or alternatively, is less than or equal to 90°. Collecting EM data over a limited range of azimuths allows for more efficient acquisition than conventional EM survey techniques that attempt to remove effects of electrical resistivity anisotropy.

In a more specific embodiment, the EM data recorded over a relatively limited range of source-receiver azimuths includes radial electric field measurements and total magnetic field measurements. A radial electric field measurement is acquired by an EM receiver with a dipole polarization that is co-axial with the source dipole polarization. Thus, if the source dipole is towed in an inline direction (x direction), then the receiver dipole would also extend generally in the x direction. In the ensuing discussion, the radial electric field is represented as E. Although reference is made to radial electric field measurements, it is noted that other embodiments can employ electric field measurements in other orientations, such as the y and z orientations that are orthogonal to the x direction (x and y extend in the horizontal plane, while z extends in the vertical direction).

A total magnetic field measurement can be acquired with a magnetometer or by an aggregation (e.g., summation) of component magnetic fields recorded in multiple different directions. The total magnetic field is direction-less, and refers to magnetic field strength or magnetic field amplitude. If component magnetic field measurements are acquired in the three different orthogonal directions, x, y, and z, then the amplitudes in the three different orthogonal directions can be aggregated to produce the total magnetic field. A benefit of using total magnetic field measurements rather than an individual component magnetic field measurement for determining electrical resistivity anisotropy according to some embodiments is that less noise effects are experienced with use of total magnetic field measurements.

Figure 1:
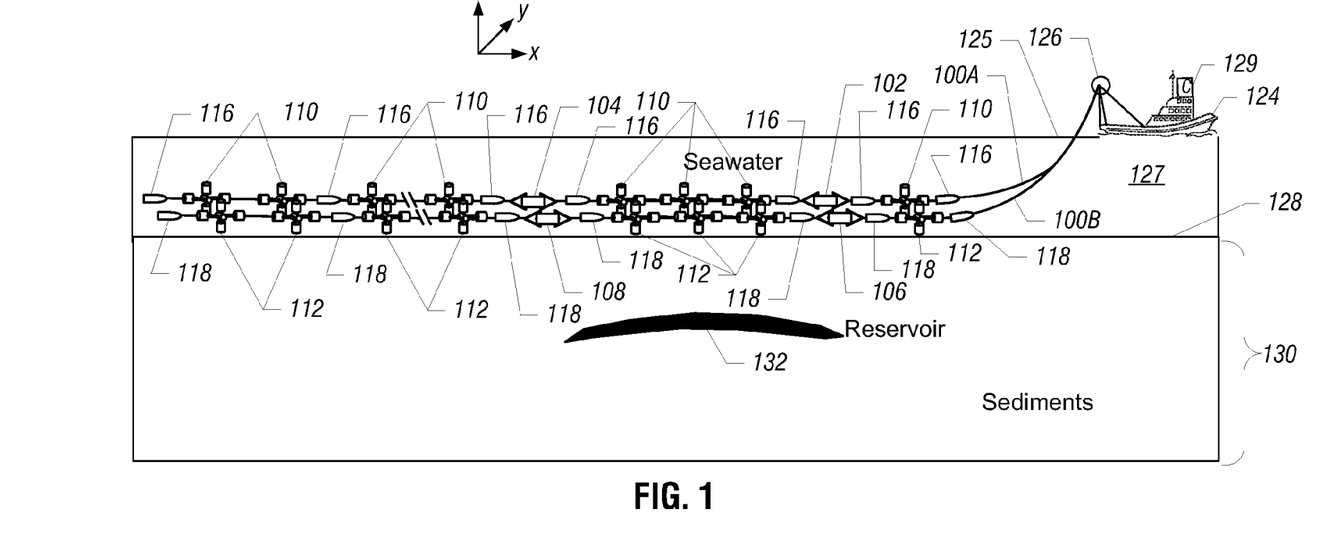
FIGS. 1-3 illustrate various configurations of performing marine surveying according to some embodiments.
Figure 2:
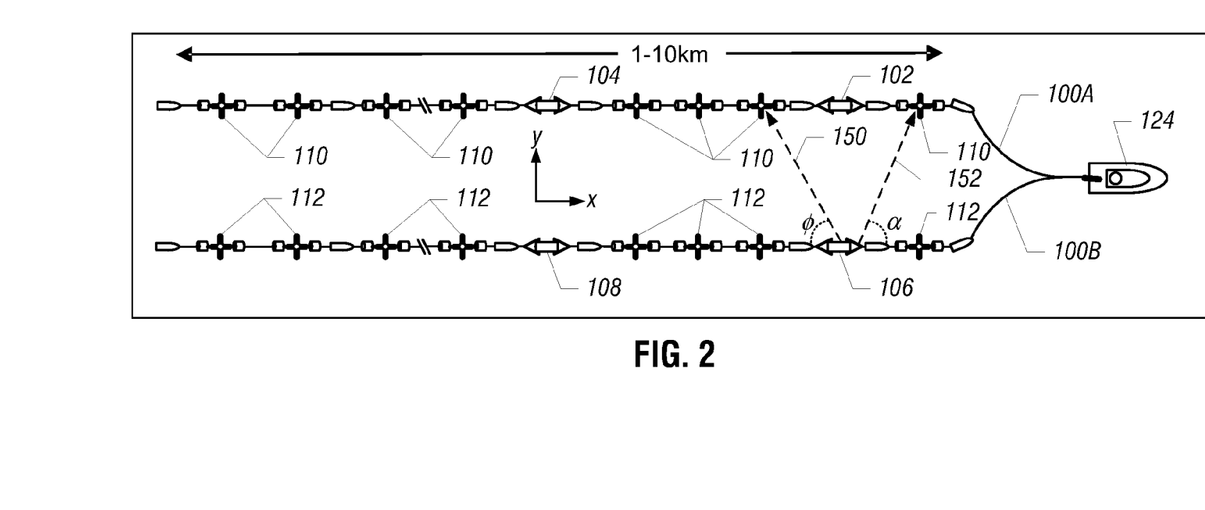

FIGS. 1 and 2 depict an example of a multi-streamer configuration (dual-streamer configuration shown) for performing a marine CSEM survey of a subterranean structure 130. The dual-streamer configuration has tow cables 100A and 100B, where the tow cable 100A has two EM sources 102 and 104, and the tow cable 100B has two EM sources 106 and 108. Although reference is made to two EM sources on each cable 100A and 100B, it is noted that in alternative embodiments, a lower number or larger number of sources can be provided on each cable 100A or 100B. In some embodiments, each EM source 102, 104, 106, and 108 is an electric dipole transmitter. In other embodiments, other types of EM sources can be used.

The tow cables 100A, 100B also include respective EM receivers 110 and 112 (which can also be implemented with electrical dipoles). The tow cables 100A, 100B are towed by a marine vessel 124, which is at the water surface 125. The marine vessel 124 has reels 126 from which the tow cables 100A, 100B can be unwound for deployment into the body of water 127.

The marine vessel 124 also includes a controller 129, which can be implemented with a computer to perform data processing on measurements collected by the EM receivers 110 and 112. Alternatively, the controller 129 can be located remotely, such as at a land location.

Each tow cable 100A, 100B also include respective steering devices 116 and 118. The steering devices 116, 118 can be "steering fish," which are dynamically controllable (such as by the controller 129) to steer the tow cables 100A, 100B such that the two cables travel in a desired paths. Note that the number of steering fish employed may be dependent on the length of each tow cable and a desired degree of accuracy to which receiver positions are maintained.

The body of water 127 sits above a water bottom surface 128 (e.g., seafloor), under which is located the subterranean structure 130. In the example of FIG. 1, a subterranean body of interest 132 is located at some depth below the seafloor 128, where the body of interest can be a hydrocarbon-bearing reservoir, a freshwater aquifer, a gas injection zone, a reservoir that contains methane hydrate deposits, a thin carbonate layer, a salt-bearing layer, and so forth. Note that plural bodies of interest may be present at various depths in the subterranean structure 130.

The towed marine cable system depicted in FIGS. 1 and 2 enable acquisition of EM measurements by the EM receivers 110, and 112, where the recorded EM measurements include EM signals perturbed (or affected) by the subterranean structure 130. The EM sources 102, 104, 106, and 108 generate EM signals that are propagated into the subterranean structure 130. The propagated EM signals are perturbed by the subterranean structure 130 and detectable by the EM receivers 110 and 112.

Each EM receiver 110, 112 can have one or more sensing elements to sense electric fields in one or more different directions, such as one or more of the x, y, and z directions (as represented in FIGS. 1 and 2). The z direction is the vertical direction, while the x and y directions are horizontal directions. The x direction refers to the direction of movement of the marine vessel 124 (and thus the general direction of movement of the cables 100A, 100B).

In some embodiments, each receiver 110, 112 records an electric field ($E_x$) in the inline direction (x direction)—the electric field $E_x$ is also referred to as a radial electric field. Optionally, an EM receiver 110 or 112 can also measure electric fields in the y and/or z directions. In addition, at least some of the receivers 110, 112 include magnetometers for measuring the total magnetic field. Alternatively, at least some of the EM receivers 110, 112 include magnetic field sensing elements to measure component magnetic fields in the x, y, and z directions, where these component magnetic fields (e.g., $H_x$, $H_y$, and $H_z$) can be combined (such as at the controller 129) to form a total magnetic field. Thus, receiving a total magnetic field measurement can refer to receiving the total magnetic field measurement taken by a magnetometer, or alternatively, a total magnetic field produced from combining component magnetic fields.

The arrangement of FIGS. 1 and 2 allows for acquisition of EM measurements at multiple source-receiver offsets (a source-receiver offset refers to the distance between an EM source and an EM receiver in the x direction), frequencies, and azimuths. An azimuth refers to the angle between the axis of an EM source (x axis in FIG. 2) and a radial line (e.g., radial line 150 or 152 in FIG. 2) between the EM source and an EM receiver. The azimuth between the radial line 150 and the x axis is represented as $\phi$ in FIG. 2, and the azimuth between the radial line 152 and the x axis is represented as a in FIG. 2. The azimuth between a source on a particular cable and a receiver on the same cable is 0°. On the other hand, the azimuth between a source on one cable and a receiver on another cable is a non-zero angle that depends on the relative positions of the source and receiver. Thus, for example, from the perspective of the source 106 on tow cable 100B, there are multiple source-receiver offsets (corresponding to the multiple receivers 110 on the tow cable 100A) and corresponding different azimuths.

In one example implementation, it is envisioned that the range in source-receiver offsets will be between 0.1 and 10 kilometers, the range of source frequency will be between 0.01 and 100 Hz, and the range of the source-receiver azimuths will be between 0 and 45° (each of $\phi$ and $\alpha$ is between 0 and 45°, for example). In other implementations, other source-receiver offsets, frequency ranges, and source-receiver azimuths can be employed.

Figure 3:
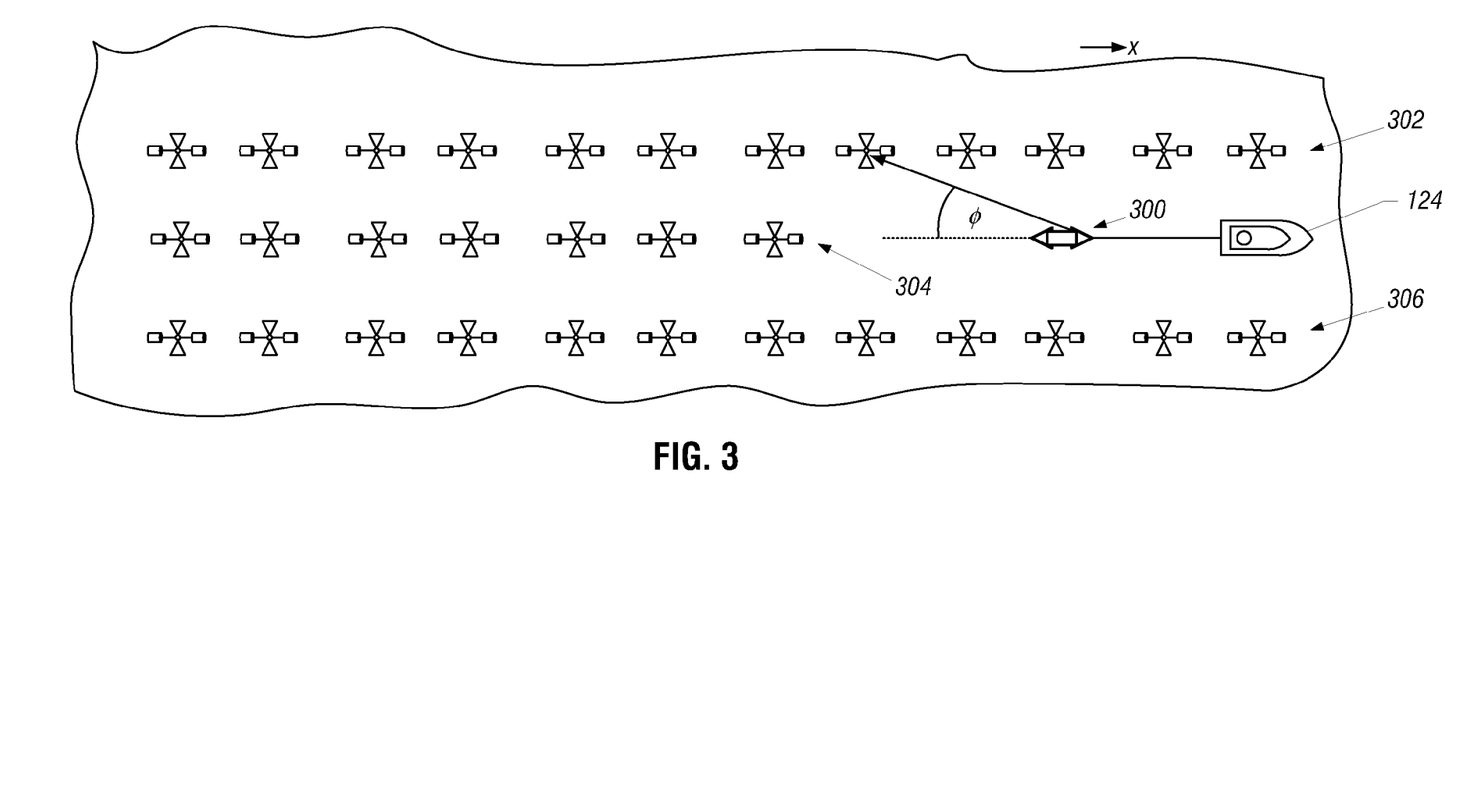

FIG. 3 shows an alternative embodiment of a marine CSEM survey arrangement in which detection and determination of electrical resistivity anisotropy can be performed. In the FIG. 3 arrangement, three rows 302, 304, and 306 of EM receivers are depicted where the three rows of EM receivers are deployed on the seafloor. In addition, the marine vessel 124 tows an EM source 300 in the inline direction (x direction). Each of the EM receivers shown in FIG. 3 can be similar to the EM receivers 110 and 112 of FIGS. 1 and 2, and can acquire measurements that include at least radial electric field measurements ($E_x$) and total magnetic field measurements, where acquiring a total magnetic field measurement includes acquiring the total magnetic field measurement using a magnetometer, or acquiring component magnetic field measurements in multiple directions that can be aggregated to produce the total magnetic field measurement. As the EM source 300 is towed, relative source-receiver offsets and source-receiver azimuths can change between the source 300 and the various receivers shown in FIG. 3.

In either the embodiment of FIGS. 1-2 or the embodiment of FIG. 3, multiple (at least two) linear receiver arrays are deployed in a parallel or near-parallel fashion to record electric and magnetic field measurements.

Figure 10:
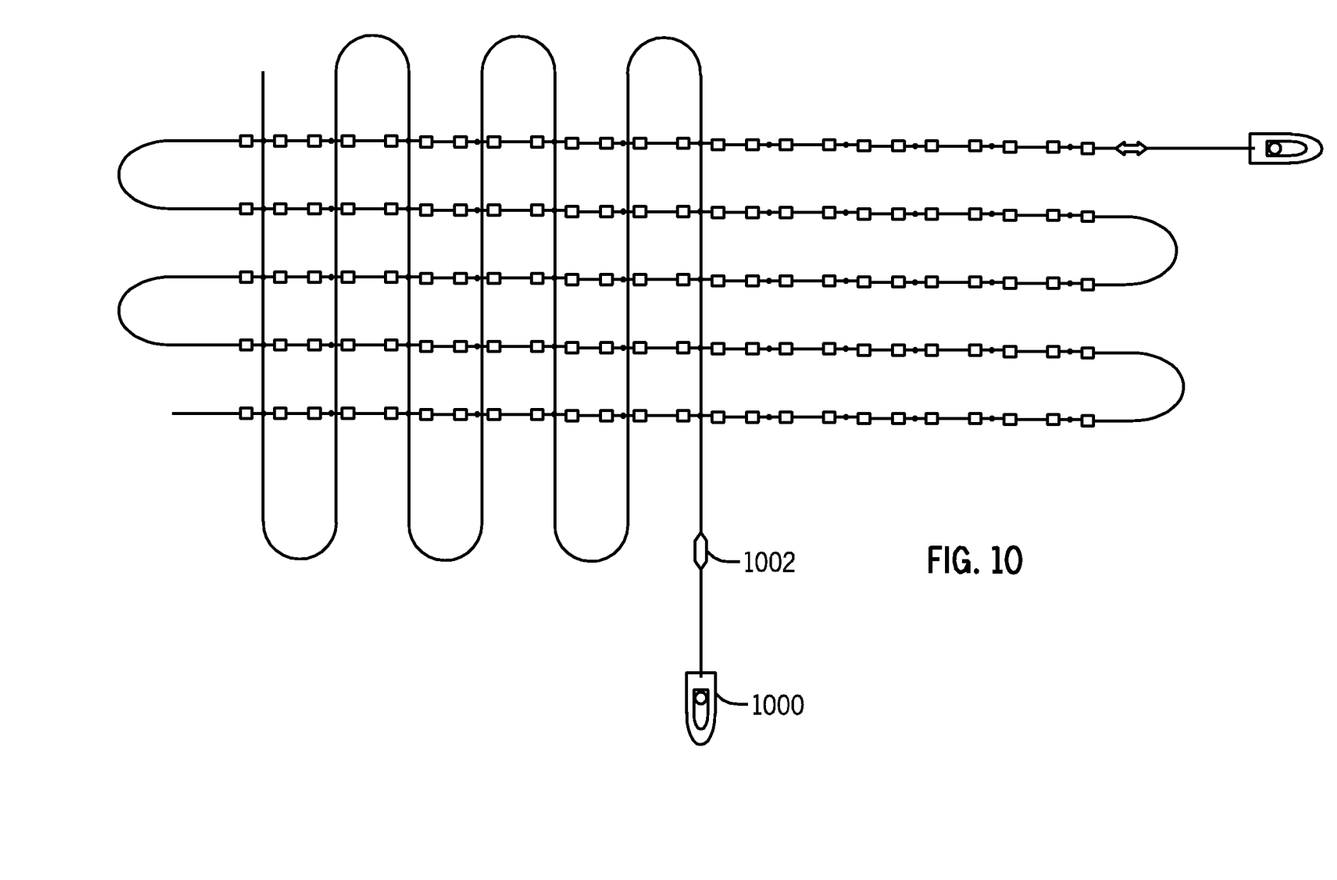
FIG. 10 illustrates a conventional marine survey arrangement.

As can be seen with the embodiments discussed above, acquisition of EM data containing sufficient information to determine electrical resistivity anisotropy can be performed in a relatively efficient manner, in which a marine vessel can tow EM source(s) along a general direction while performing the EM data acquisition (using a limited range of source-receiver azimuths). This is contrasted to conventional techniques (such as shown in FIG. 10) in which a marine vessel 1000 would have to tow the EM source(s) 1002 in multiple orthogonal directions (inline direction plus broadside direction) in order to acquire EM data using a wide range of source-receiver azimuths.

Although reference has not been made to the effect of frequency, it is noted that additional stability and the interpretation of VTI resistivity can be obtained if measurements were made at multiple (at least two) transmitted frequencies and source-receiver offsets.

Figure 4A:
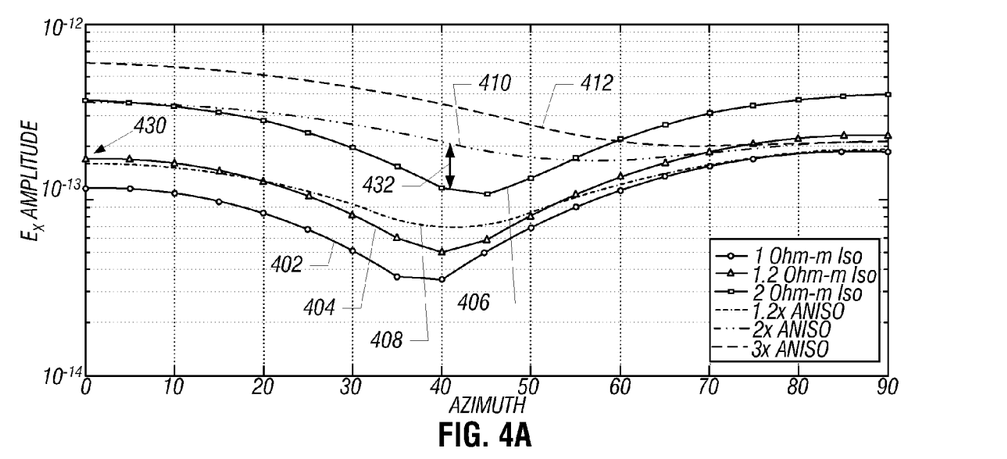
FIGS. 4A and 4B are graphs illustrating electric field amplitudes and total magnetic field amplitudes as a function of source-receiver azimuths.
Figure 4B:
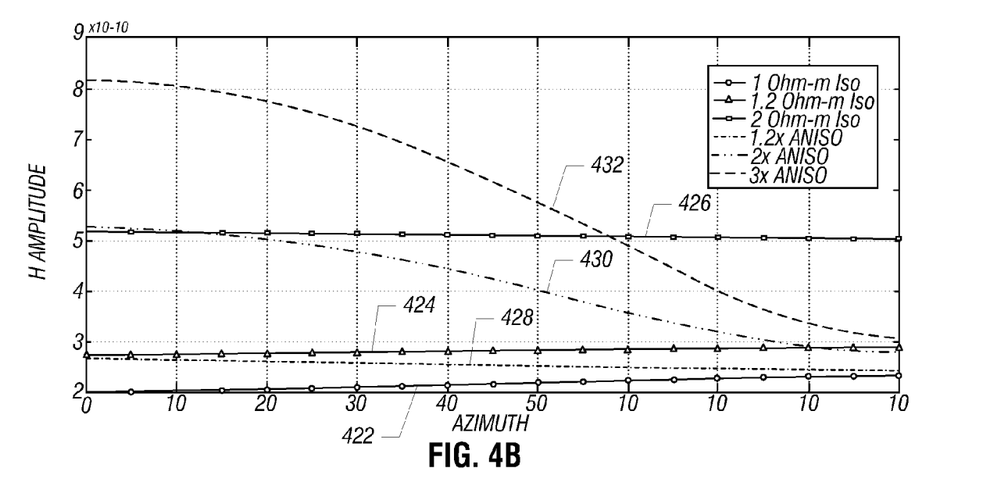

FIGS. 4A and 4B are graphs showing the $E_x$ amplitude and total magnetic field amplitude, respectively, as a function of source-receiver azimuth (expressed as degrees). Six curves are shown in each of FIGS. 4A and 4B to represent synthetic (simulated) data obtained using different models. Each model includes two infinite-thickness layers where the body of water 127 (upper halfspace) has a predefined resistivity, and the overburden (lower halfspace) representing the subterranean structure 130 is either assumed to be isotropic or anisotropic. The data for three isotropic models and for three anisotropic models are depicted in FIGS. 4A and 4B. The anisotropic halfspace models have a constant horizontal resistivity of 1.0 Ωm (ohms-meter) and a variable vertical resistivity of 1.2, 2.0, and 3.0 Ωm, respectively, which are denoted by the anisotropy ratios $\rho_v/\rho_h$ (vertical resistivity divided by horizontal resistivity) of 1.2×, 2×, and 3× in FIGS. 4A and 4B. Although specific resistivities are assumed, it is noted that such specific resistivities are provided for purposes of example and discussion—other implementations can employ other resistivity values.

Curves 402, 404, and 406 in FIG. 4A depict the $E_x$ amplitude as a function of azimuth for the isotropic halfspace models, respectively, with the following respective resistivities: 1.0 Ωm, 1.2 Ωm, and 2 Ωm. Curves 408, 410, and 412 represent the $E_x$ amplitude as a function of azimuth for the anisotropic halfspace models, respectively, with the following corresponding anisotropy ratios: 1.2×, 2×, and 3×.

Similarly, in FIG. 4B, curves 422, 424, and 426 represent the total magnetic field amplitude as a function of azimuth for the corresponding isotropic halfspace models, respectively, with the respective resistivities: 1 Ωm, 1.2 Ωm, and 2 Ωm. Also, curves 428, 430, and 432 represent the total magnetic field amplitudes as a function of azimuth for the following three corresponding anisotropic halfspace models, respectively, with the respective anisotropy ratios: 1.2×, 2×, and 3×.

It is apparent from FIG. 4A that the radial electric field ($E_x$) varies strongly with source-receiver azimuth for both isotropic and anisotropic earth models. This demonstrates that electric fields have differential sensitivity to even isotropic resistivity as source-receiver azimuth changes. The inline (0° azimuth) electric field amplitudes over isotropic models have nearly identical amplitudes (as indicated by arrow 430 in FIG. 4A) as certain fields over anisotropic models (e.g., as depicted by curves 408 and 404 representing $E_x$ amplitude for 1.2 Ωm isotropic and 1.2× anisotropic models). This characteristic limits the interpretation of electrical resistivity anisotropy using just inline radial electric fields, because there is an equivalence in electric field amplitude that can arise over both an isotropic and anisotropic earth.

By obtaining measurements within a limited range of azimuths (such as between 0 and 45°), some differential sensitivity to strong VTI resistivity (e.g., as depicted by curves 410 and 406 in FIG. 4A representing $E_x$ amplitude for 2 Ωm isotropic and 2× anisotropic models) can be provided, as indicated by a vertical dashed line 432. However, there is still a limitation to using the narrow-azimuth fields, since they show decreasing differential sensitivity as anisotropy ratios decrease. Results for the 1.2 Ωm isotropic and 1.2× anisotropic fields (curves 408 and 404) in FIG. 4A demonstrate the similarity in $E_x$ amplitudes at azimuths less than 30°.

The foregoing can be mitigated by measuring and using total magnetic fields in combination with narrow-azimuth electric fields. Using total magnetic field measurements is preferable over component magnetic field measurements, since total magnetic field measurements are expected to have less acquisition noise. FIG. 4B shows that the total magnetic fields are also differentially sensitive to the resistivity and degree of anisotropy and the total magnetic fields demonstrate progressively less differential sensitivity as anisotropy weakens. However, the relationship between field strength at various azimuths over isotropic and anisotropic models is different than that for the $E_x$ fields. It is this contrast in total magnetic field azimuthal behavior that can be exploited to constrain anisotropy when combined with $E_x$ field data.

Figure 5A:
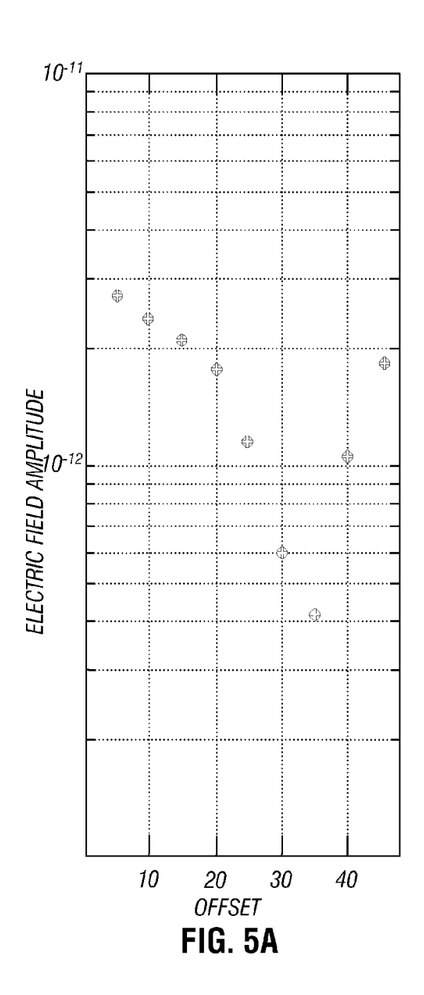
FIGS. 5A-5C, 6A-6C, and 7A-7C are graphs depicting observed data points and predicted data points (calculated based on an isotropic or anisotropic earth model) to illustrate correctness of the predicted data points using different ones of the models.
Figure 5B:
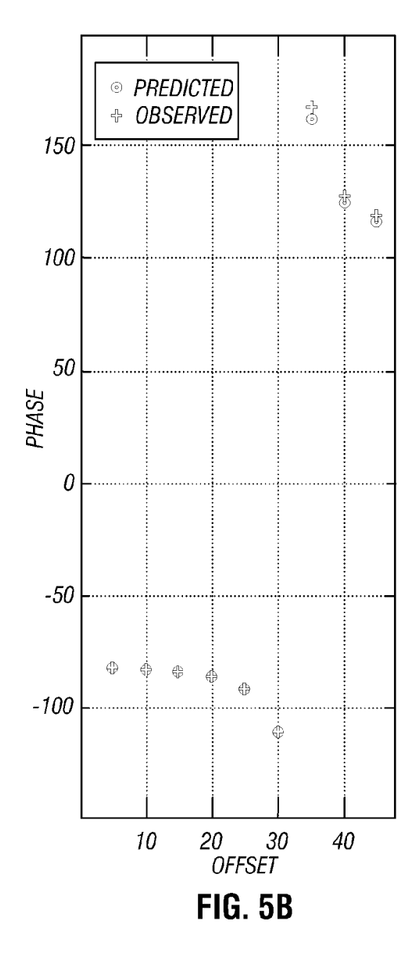
Figure 5C:
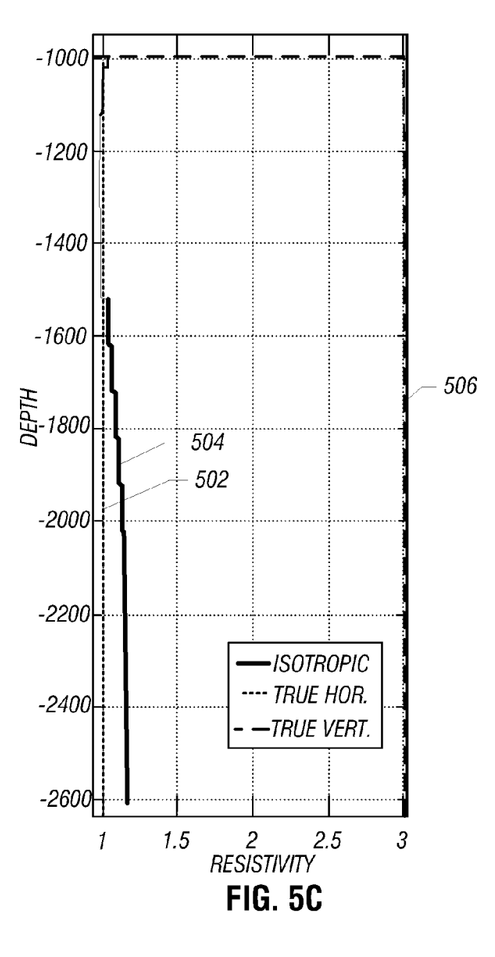

FIGS. 5A-5C are various graphs to illustrate that when relying only upon radial electric field measurements, an incorrect isotropic earth model can fit the data as well as the correct anisotropic earth model. FIG. 5A illustrates electric field amplitude as a function of source-receiver offset, and FIG. 5B shows the phase of the electric field as a function of source-receiver offset. FIG. 5C illustrates resistivity as a function of depth from the seafloor in the subterranean structure 130.

FIG. 5A shows "observed" $E_x$ amplitudes (+ symbols) and "predicted" $E_x$ amplitudes (o symbols). FIG. 5B shows "observed" phases (+ symbols) and "predicted phases (o symbols). The observed $E_x$ amplitudes and phases are simulated using an anisotropic earth model (which is the correct model for the subterranean structure). The predicted $E_x$ amplitudes and phases are inverted from an isotropic earth model, which is the incorrect model for the subterranean structure. As can be seen in FIGS. 5A-5B, the observed data ($E_x$ amplitudes and phases) match the predicted data ($E_x$ amplitudes and phases), which is an incorrect result, since an incorrect isotropic earth model can fit the data as well as the correct anisotropic earth model (which results from false VTI interpretation).

FIG. 5C illustrates a curve 504 representing the resistivity of the isotropic earth model as a function of depth, whereas curves 502 and 506 represent the true horizontal resistivity and vertical resistivity, respectively, of the subterranean structure 130, which exhibits anisotropy.

Although limited-azimuth radial electric and total magnetic field data may not uniquely constrain weak homogeneous anisotropy individually, their combination can, as discussed above. The addition of total magnetic field measurements mitigates the equivalence between heterogeneous isotropic models and homogeneous anisotropic models, as illustrated by FIGS. 6A-6C and 7A-7C, since the magnetic and electric fields are differentially sensitive to heterogeneous resistors.

Figure 6A:
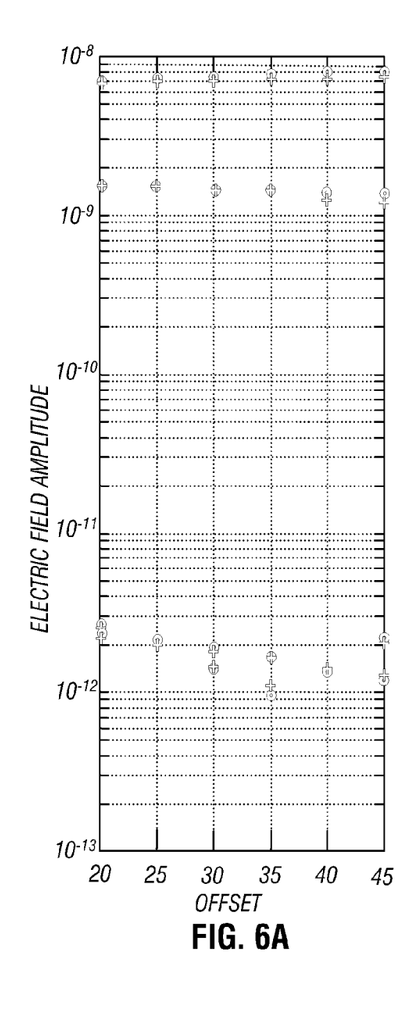
Figure 6B:
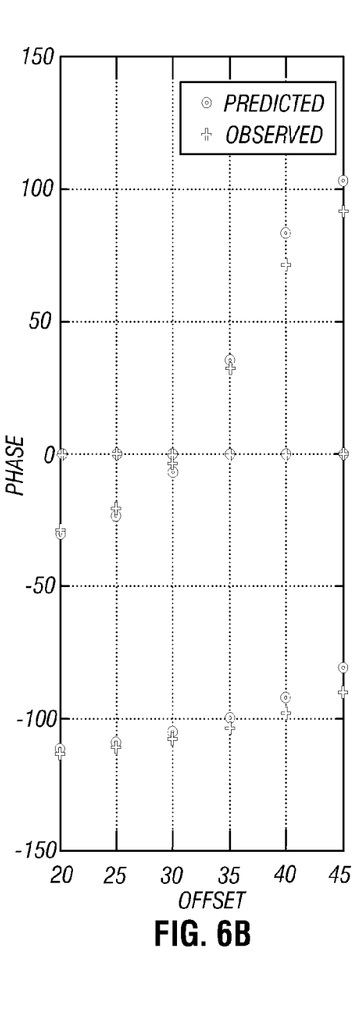
Figure 6C:
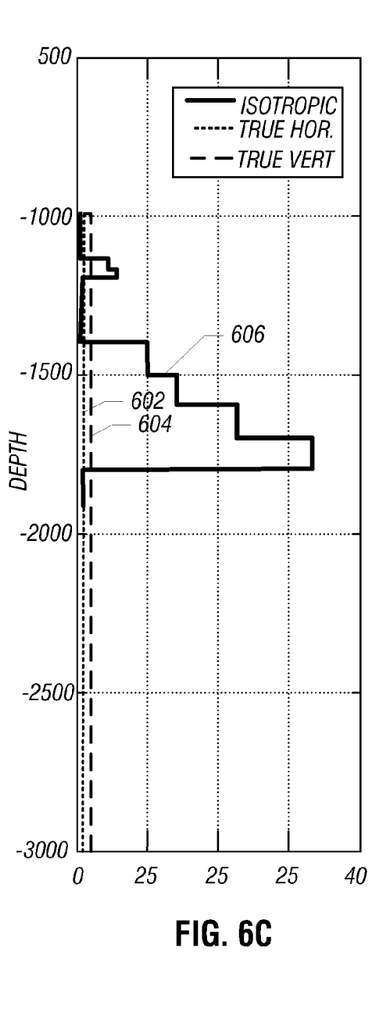
Figure 7A:
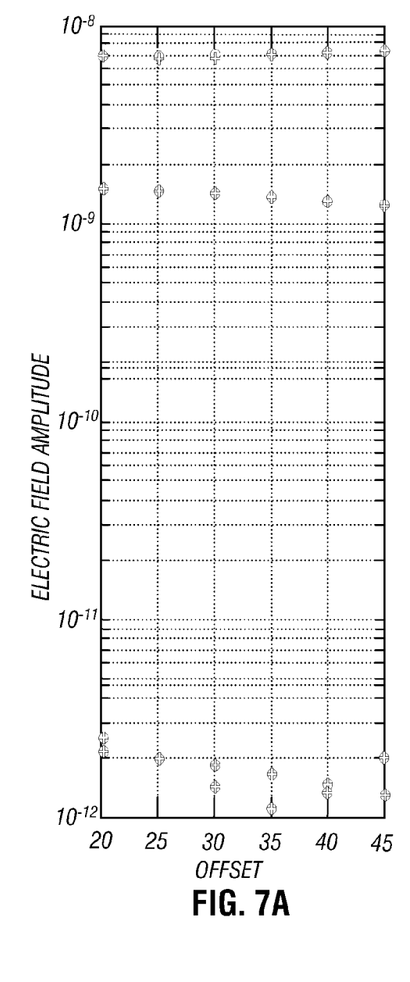
Figure 7B:
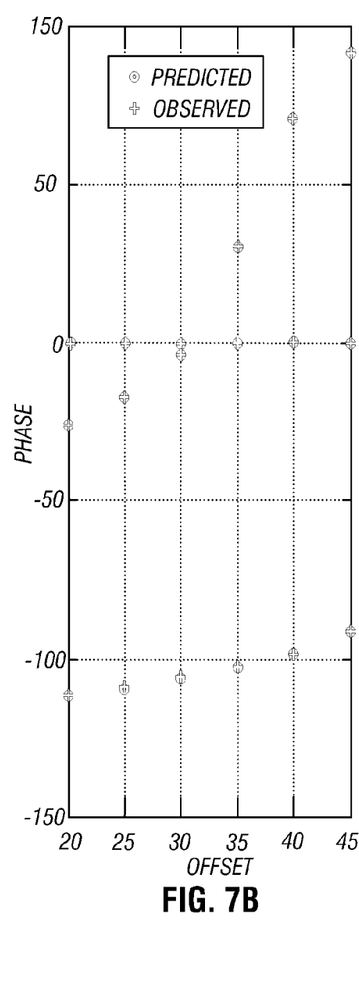
Figure 7C:
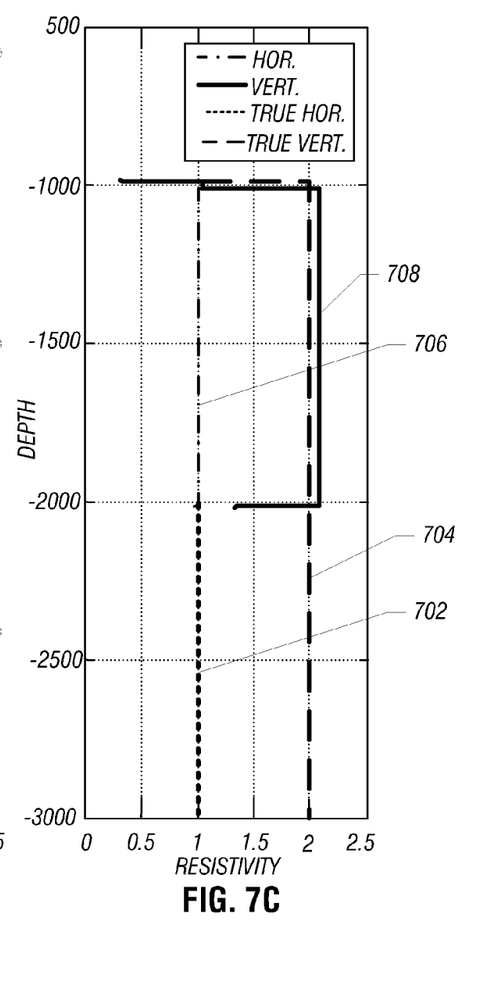

FIGS. 6A-6C are graphs that assume an isotropic earth model (incorrect model), while FIGS. 7A-7C are graphs that assume a correct anisotropic earth model. FIG. 6C shows curves 602 and 604 that represent the true horizontal and vertical resistivities, respectively, while the curve 606 represents the resistivity of an isotropic model. As can be seen in FIG. 6C, the isotropic model resistivities are quite different from the anisotropic resistivities.

FIG. 6A shows "observed" $E_x$ amplitudes (+ symbols) and "predicted" $E_x$ amplitudes (o symbols). FIG. 6B shows "observed" phases (+ symbols) and "predicted phases (o symbols). The observed $E_x$ amplitudes and phases are simulated using an anisotropic earth model (which is the correct model for the subterranean structure). The predicted $E_x$ amplitudes and phases are inverted from the isotropic earth model, which is the incorrect model for the subterranean structure. As can be seen in FIG. 6B, the observed phase data points are separated from the predicted data points, which correctly reflect the fact that the isotropic earth model is not the correct model.

FIG. 7C shows curves 702 and 704 that represent the true horizontal and vertical resistivities, respectively, while the curves 706 and 708 represent the horizontal and vertical resistivities of an anisotropic model. As can be seen in FIG. 7C, the anisotropic model resistivities are close to the true resistivities.

FIG. 7A shows "observed" $E_x$ amplitudes (+ symbols) and "predicted" $E_x$ amplitudes (o symbols). FIG. 7B shows "observed" phases (+ symbols) and "predicted phases (o symbols). The observed $E_x$ amplitudes and phases are simulated using an anisotropic earth model (which is the correct model for the subterranean structure). The predicted $E_x$ amplitudes and phases are inverted from the anisotropic earth model, which is the correct model for the subterranean structure. As can be seen in FIGS. 7A and 7B, the observed $E_x$ and phase data points match the predicted data points, which correctly reflects the fact that the anisotropic earth model is the correct model.

Figure 8:
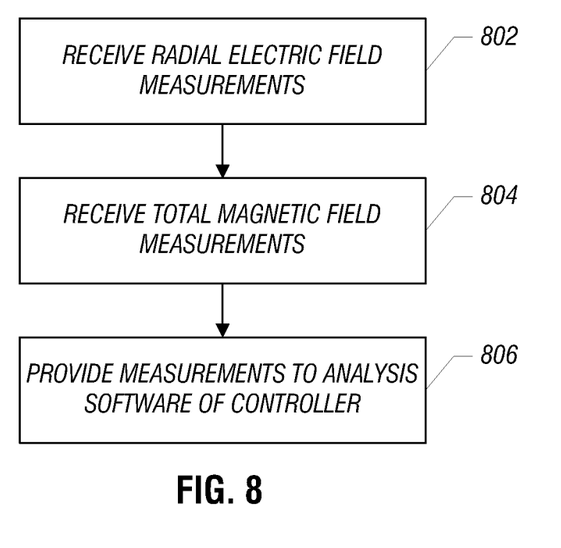
FIG. 8 is a flow diagram of a process of acquiring data for determining electrical resistivity anisotropy, according to an embodiment.

FIG. 8 is a flow diagram of a process of analyzing content of a subterranean structure, according to an embodiment. Radial electric field measurements (over plural source-receiver azimuths within a predefined range) are received (at 802), by the controller 129, from EM receivers. Although reference is made to receiving radial electric field measurements, it is noted that electric field measurements in other orientations can also be received. In addition, total magnetic field measurements (over plural source-receiver azimuths within the predefined range) are also received (at 804) by the controller 129. Receiving the total magnetic field measurements can refer to receiving total magnetic field measurements from a magnetometer (or multiple magnetometers), or to receiving component magnetic field measurements that are then combined to produce the total magnetic field measurements (a process referred to as inversion).

The received radial electric field measurements and total magnetic field measurements are provided (at 806) to an analysis software executable in the controller 129 to enable a determination of electrical resistivity anisotropy of the subterranean structure. The magnitude, depth, and distribution of the electrical resistivity anisotropy are determined by analyzing the electric field measurements and total magnetic field measurements. In some implementations, such analyzing can involve performing forward modeling and comparing modeled responses with the actual received measurements. The model can be iteratively adjusted until the modeled responses match the actual received measurements, including the electric field measurements and total magnetic field measurements.

The determined electrical resistivity anisotropy can then be accounted for in the processing of EM data for determining characteristics of the subterranean structure 130 such that a representation (e.g., geological model) of the content of the subterranean structure 130 is produced.

Figure 9:
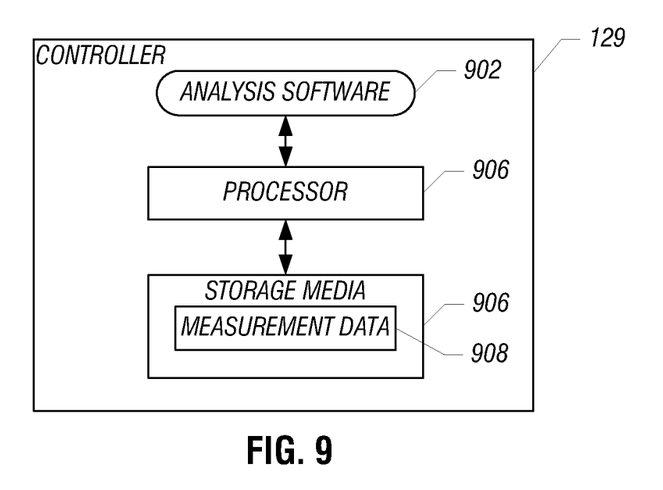
FIG. 9 is a block diagram of a controller for performing tasks according to an embodiment.

FIG. 9 illustrates an example arrangement of the controller 129, which can be a computer. The controller 129 includes analysis software 902 capable of performing various tasks discussed above. The analysis software 902 is executable on a processor 904, which is connected to storage media 906. The storage media 906 can store measurement data 908, including the electric field measurements and total magnetic field measurements discussed above.

Instructions of software described above (including the analysis software 902) are loaded for execution on the processor 904. The processor includes microprocessors, microcontrollers, processor modules or subsystems (including one or more microprocessors or microcontrollers), or other control or computing devices. As used here, a "processor" can refer to a single component or to plural components (e.g., one CPU or multiple CPUs on one or multiple computers).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of analyzing content of a subterranean geological structure, comprising:
    receiving, by a computer, first data corresponding to electric field measurements at plural source-receiver azimuths in a predefined range;
    receiving, by the computer, second data corresponding to total magnetic field measurements at plural source-receiver azimuths in the predefined range;
    wherein the received first and second data corresponding to the electric field measurements and the total magnetic field measurements are acquired using electromagnetic (EM) receivers carried by a plurality of cables towed by at least one marine vessel, at least two of the plurality of cables also carrying respective EM sources, and
    wherein the azimuths are defined between the EM sources and the EM receivers carried by the cables; and
    providing the first data and the second data to an analysis module executed in the computer to determine electrical resistivity anisotropy of the subterranean geological structure.

2. The method of claim 1, wherein the predefined range starts at a first azimuth and ends at a second azimuth, wherein a difference between the first and second azimuths is less than 90°.

3. The method of claim 2, wherein the difference between the first and second azimuths is less than or equal to 60°.

4. The method of claim 2, wherein the difference between the first and second azimuths is less than or equal to 45°.

5. The method of claim 1, wherein receiving the first data corresponding to the electric field measurements comprises receiving data corresponding to radial electric field measurements.

6. The method of claim 1, wherein receiving the second data corresponding to the total magnetic field measurements comprises receiving the second data corresponding to the total magnetic field measurements from magnetometers.

7. The method of claim 1, wherein receiving the second data corresponding to the total magnetic field measurements comprises receiving data corresponding to component magnetic field measurements in multiple directions and aggregating the data corresponding to the component magnetic field measurements to produce the second data corresponding to the total magnetic field measurements.

8. The method of claim 1, further comprising removing an effect of the determined electrical resistivity anisotropy during processing of electromagnetic data perturbed by the subterranean structure to determine a representation of the content of the subterranean structure.

9. The method of claim 1, wherein receiving the first and second data comprises receiving the first and second data corresponding to the electric field measurements and total magnetic field measurements at plural source-receiver offsets.

10. The method of claim 1, wherein receiving the first and second data comprises receiving the first and second data corresponding to the electric field measurements and total magnetic field measurements at a plurality of frequencies transmitted by the EM sources.

11. The method of claim 1, wherein the source-receiver azimuths are non-zero azimuths.

12. A system for surveying a subterranean geological structure, comprising:
a plurality of cables carrying electromagnetic (EM) receivers;
EM sources arranged on at least two of the plurality of cables, wherein the plurality of cables are configured to be towed through a body of water generally along a first direction such that a limited range of azimuths are provided between the EM sources and the EM receivers,
wherein the EM receivers are configured to acquire electric field measurement data and total magnetic field measurement data at plural source-receiver azimuths in the limited range of azimuths, and
wherein the electric field measurement data and the total magnetic field measurement data are provided to a controller to determine an electrical resistivity anisotropy of the subterranean structure.

13. The system of claim 12, wherein the plurality of cables are configured to be towed by a marine vessel.

14. The system of claim 12, wherein the source-receiver azimuths are non-zero azimuths.

15. An article comprising at least one non-transitory computer-readable storage medium containing instructions that upon execution by a processor causes the processor to:
receive first data corresponding to electric field measurements acquired at plural source-receiver azimuths in a predefined range;
receive second data corresponding to total magnetic field measurements acquired at plural source-receiver azimuths in the predefined range,
wherein the received first and second data correspond to the electric field measurements and the total magnetic field measurements acquired using electromagnetic (EM) receivers carried by a plurality of cables towed by at least one marine vessel, at least two of the plurality of cables also carrying EM sources, and wherein the azimuths are defined between the respective EM sources and the EM receivers carried by the cables; and
process the first data and the second data to determine an electrical resistivity anisotropy of a subterranean geological structure.

16. The article of claim 15, wherein the source-receiver azimuths are non-zero azimuths.

* * * * *